(12) United States Patent
Nicolai et al.

(10) Patent No.: US 7,535,181 B2
(45) Date of Patent: May 19, 2009

(54) METHOD AND DEVICE FOR BALLAST MANAGEMENT IN PARTICULAR FOR A MOTOR VEHICLE HEADLAMP

(75) Inventors: Jean-Marc Nicolai, Courbevoie (FR); Marc Duarte, Villemomble (FR)

(73) Assignee: Valeo Vision, Bobigny (FR)

( * ) Notice: Subject to any disclaimer, the term of this patent is extended or adjusted under 35 U.S.C. 154(b) by 280 days.

(21) Appl. No.: 11/424,580

(22) Filed: Jun. 16, 2006

(65) Prior Publication Data

US 2006/0284564 A1 Dec. 21, 2006

(30) Foreign Application Priority Data

Jun. 17, 2005 (FR) .................... 05 06194

(51) Int. Cl.
*H05B 37/02* (2006.01)

(52) U.S. Cl. .................... 315/82; 315/308; 315/DIG. 5

(58) Field of Classification Search .................. 315/291, 315/308, DIG. 5, 224, 246, 250, 82

See application file for complete search history.

(56) References Cited

U.S. PATENT DOCUMENTS

| | | | |
|---|---|---|---|
| 5,463,287 A | 10/1995 | Kurihara et al. | |
| 5,481,163 A | 1/1996 | Nakamura et al. | |
| 6,051,939 A | 4/2000 | Eckert | |
| 6,515,881 B2 * | 2/2003 | Chou et al. | ............ 363/95 |
| 6,586,884 B2 | 7/2003 | Leleve | |
| 2006/0055341 A1 | 3/2006 | Watanabe et al. | |

FOREIGN PATENT DOCUMENTS

| | | |
|---|---|---|
| EP | 1248498 | 10/2002 |
| EP | 1615475 | 1/2006 |
| WO | WO 2004/066687 | 8/2004 |

OTHER PUBLICATIONS

J.W. Specks et al., LIN—Protocol, Development Tools, and Software Interfaces for Local Interconnect Networks in Vehicles, 9th International Conference on Electronic Systems for Vehicles, Baden-Baden, Oct. 5-6, 2000, pp. 1-24.

* cited by examiner

*Primary Examiner*—David Hung Vu
(74) *Attorney, Agent, or Firm*—Jacox, Meckstroth & Jenkins

(57) ABSTRACT

A method for managing a gas discharge lamp in particular for a motor vehicle headlamp. The method is of the type which consists in controlling initial and nominal supply powers of the lamp by means of control signals during the operating phases of the lamp which comprise a start-up phase, an ignition phase and a steady-state phase. The method is wherein the control signals comprise command signals which are generated externally of the ballast and which force each of the supply powers to a value selected from a set of predetermined powers as a function of each of the phases. The method makes it possible for example to manage the different modes defined by the new regulations of the AFS type, and to optimize the service life of the lamp.

17 Claims, 5 Drawing Sheets

METHOD AND DEVICE FOR BALLAST MANAGEMENT IN PARTICULAR FOR A MOTOR VEHICLE HEADLAMP

TECHNICAL FIELD OF THE INVENTION

The present invention relates to a method and a device for managing a ballast of a gas discharge lamp for a motor vehicle headlamp, and to the use thereof in evolved or adaptive lighting systems, in particular to vary the supply power of standard xenon lamps of the D1, D2, D3 or D4 type, so as for example to manage the different modes defined by the new regulations of the AFS type, and to optimize the service life of the lamp.

TECHNOLOGICAL BACKGROUND OF THE INVENTION

With the aim of improving both the luminous power and the energy yield of vehicle lighting devices, in particular headlamps, there is a current technical trend to replace filament lamps with gas discharge lamps. Unlike conventional bulbs, which were designed to be connected directly to the battery of the vehicle, these new lamps require high voltages, AC or DC depending on the operating mode, in order to create and maintain the electrical discharge in the gas.

These high voltages, which are specific to each type of lamp (around 25 kV for igniting a xenon lamp), are produced from the on-board voltage by a supply module which also regulates the power and is known under the name of "ballast".

This supply module generally comprises, in a manner known per se, a DC/DC converter for producing a high DC voltage from the low voltage of the battery, a DC/AC converter for producing the AC voltage necessary for supplying the lamp, and a circuit for producing the start-up pulse.

These various blocks are controlled by an electronic control block which regulates the power supplied to the lamp as a function of its current/voltage characteristic, which varies according to the operating phases and evolves over the service life of the lamp.

This is therefore an intrinsic power regulation associated with the operation of the lamp itself By contrast, the development of evolved or advanced lighting systems of the AFS type (Advanced Front lighting System or Adaptive Front lighting System) for motor vehicles has made it apparent that there is a need for regulation and/or variability of the power from outside the ballast.

The new dynamic lighting technology DBL (Dynamic Bending Light) adapts the orientation of the front headlamps as a function of the speed of the vehicle and the bends in the road.

Advanced lighting systems also take account of the ambient light at night, and during the day are capable of turning the headlights on and off when entering and leaving a tunnel.

In simple manual-control systems, the intensity of the headlights must also be able to change rapidly: switching between full beam/dipped beam, flashing headlights.

In this latter case, the lamp must work for a short time beyond its nominal power; in other circumstances, it is not necessary for it to continue to operate at its nominal power.

It has been found that a precise adaptation of the electrical power supplied to the lamp as a function of requirements leads, on average, to a reduction in the consumption of on-board energy, and to an improvement in the service life of the lamp.

Systems for managing the applied electrical power are known in many technical fields in which gas discharge lamps are used.

However, the technical specifications of a method and a device for managing a ballast intended for motor vehicles comprise specific constraints which generally do not exist in other applications:
- speed of passing from one operating mode to another;
- ability to remotely signal faults (breakdown diagnostics);
- ability to be installed on board;
- compatibility with existing electronic equipment, in particular the standard on-board networks, for example LIN (Local Interconnect Network) or CAN (Controller Area Network).

In the field of equipment for motor vehicles, there is specifically known a ballast for a discharge lamp in which the power delivered is controlled by an external signal. This ballast is described in U.S. patent application U.S. Pat. No. 6,051,939, which was published on 18 Apr. 2000.

This device is based essentially on the storage and use of the current/voltage characteristic of the lamp. It therefore concerns a method for externally controlling the power of the lamp at any given time, rather than a method for selecting the operating mode with a view to optimizing the service life.

On the other hand, such a method in which, during the ignition phase, the intensity of the current and/or of the supply power of the lamp is controlled as a function of a parameter representative of the external luminosity of the vehicle, in order to effectively optimize the service life of the lamp, is described for example in European patent application EP1248498 by the Applicant, which was published on 9 Oct. 2002.

However, the scope of this latter method is restricted to the particular case of controlling the headlights as a function of the ambient lighting.

As shown in the prior art documents mentioned above, no generic method or device exists for managing a discharge lamp ballast in order to optimize the service life of the lamp, the method or device being adapted to the various present or future intelligent lighting systems for motor vehicles.

GENERAL DESCRIPTION OF THE INVENTION

The present invention therefore relates to a method of managing a ballast of a gas discharge lamp for a motor vehicle headlamp in order to optimize the service life of this lamp and to fulfill new requirements associated with the regulations and the breakdown diagnostics.

This method is of the type, known per se, which consist in controlling the initial and nominal supply powers of the lamp by means of control signals during the different operating phases of the lamp, such as the start-up phase, the ignition phase and the steady-state phase.

The method according to the invention is noteworthy in that the control signals comprise command signals which are generated externally of the ballast and which force each of the supply powers to a value selected from a set of predetermined powers as a function of each of the operating phases.

Highly advantageously, in the absence of these command signals, the value of the supply power during the start-up and ignition phases is a predetermined default initial power and the power during the steady-state phase is a likewise predetermined default nominal power.

Preferably, each of the command signals is associated with a specific operating mode (of which there are advantageously three in number) of the lamp and forces the supply power to a predetermined specific initial power and to a predetermined specific nominal power for each of these phases.

Additional features of the method according to the invention, taken in isolation or in combination, are that the control signals also comprise:

- a validation signal for validating the command signals which is generated externally of the ballast;
- an anomaly signal which is generated by the ballast in the event of an operating anomaly;
- a status request signal which is generated externally of the ballast following the receipt of the anomaly signal;
- an anomaly code which is generated by the ballast following the receipt of the status request signal.

Advantage is taken of the fact that each of the command signals consists of a first square-wave pulse train of predetermined frequency and of predetermined duty factor, and that the validation signal is a first square-wave pulse which is transmitted simultaneously with the command signals and for a duration that is at least equal to a minimum number of periods of the pulse train, preferably two.

The amplitudes of the first train and of the first validation pulse are preferably positive and are equal to the voltage of the battery or the analogous electrical power source of the vehicle. This first pulse is active at low level, and the voltage level of the battery corresponds to an absence of signal.

Advantageously, in the method according to the invention, the anomaly signal, the status request signal and the anomaly code are respectively a second square-wave pulse, a third square-wave pulse and a second square-wave pulse train, the duration of each of the pulses of the second train being representative of a type of anomaly.

Preferably, the amplitudes of the second and third pulses and of the second train are positive and are equal to the voltage of the battery or the analogous electrical power source of the vehicle. The second and third pulses are active at low level; the voltage level of the battery corresponds to an absence of signal.

The invention also relates to a device for managing a ballast of a gas discharge lamp for a motor vehicle headlamp, which is suitable for implementing the method described above.

This device is of the type, known per se, in which an external electronic command unit is connected to an electronic control block of the ballast which controls a DC/DC converter, a DC/AC converter and a start-up block for starting the lamp.

The device according to the invention is noteworthy in that the connection between the external electronic command unit and the electronic control block of the ballast comprises a dedicated two-wire connection, comprising a first, bidirectional data transfer line and a second, unidirectional signalling line for signalling by the electronic command unit.

According to one variant, the device according to the invention is also noteworthy in that the connection between the external electronic command unit and the electronic control block of the ballast comprises a standard single-wire connection, of the LIN or CAN type, which connects the electronic command unit to an interface module which carries out the protocol conversion between the standard single-wire connection and the dedicated two-wire connection.

According to another similar variant of the invention, the interface module controls the power of at least two headlamps, and is advantageously connected to each of the ballasts of these headlamps by one such dedicated two-wire connection.

The invention also relates to one particularly advantageous use of the method and devices described above in an evolved or adaptive lighting system, of the AFS type, in particular for transitions between full beam/dipped beam, adaptation to the ambient light and modulation of the intensity of the beam when travelling round bends.

These few essential specifications will have made the person skilled in the art aware of the advantages provided by the method according to the invention for managing a ballast in order to optimize the service life of a gas discharge lamp for a motor vehicle compared to the prior art.

The detailed specifications of the method, and of devices suitable for implementing it, are given in the following description in conjunction with the appended drawings. It should be noted that these drawings have no other aim than to illustrate the text of the description, and do not in any way limit the scope of the invention.

DESCRIPTION OF THE PREFERRED EMBODIMENTS OF THE INVENTION

Switching from the "off" state to the "on" state of a gas discharge lamp, for example a xenon lamp, is a process which is much more complex than simply applying a voltage to an incandescent lamp.

For an optimum yield and a maximum service life of the lamp, the electrical power applied during the start-up, ignition and steady-state phases must vary as a function of time, according to a predetermined law which is specific to each lamp. The power applied in one phase has an influence on the power to be applied in another phase. For example, if the power applied during the start-up and ignition phases is insufficient, the lamp may not be hot enough, and the yield in the steady state will be lower. This steady state will then require more electrical power in order to achieve the same luminous power.

Whereas the operation of an incandescent lamp is simply characterized by an operating "point" (that is to say the value of the applied voltage and the value of the intensity of the current), that of a gas discharge lamp is characterized by an operating "mode" which is represented by a curve showing the variation in the applied electrical power as a function of time.

Figure 1:
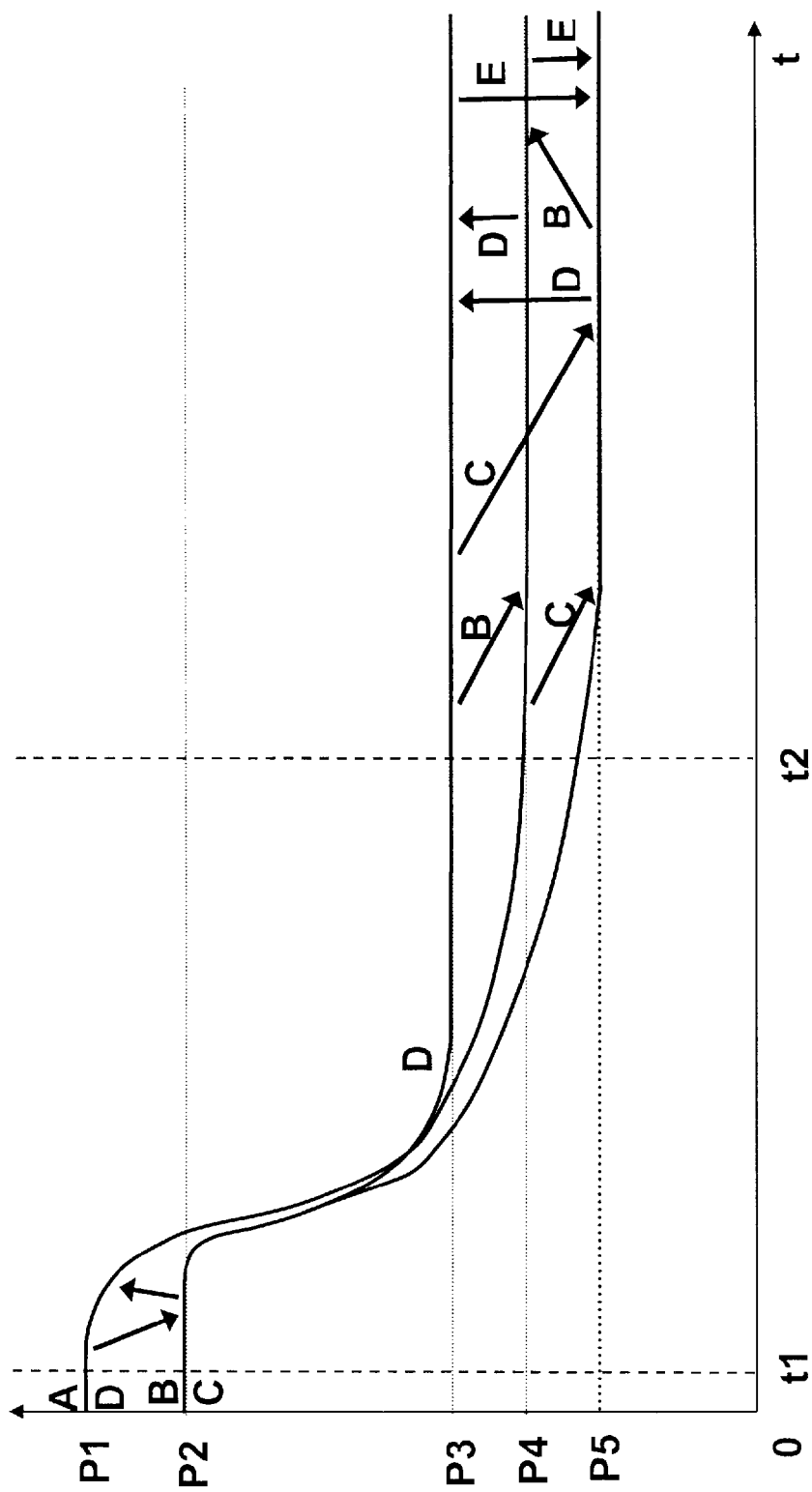
FIG. 1 schematically shows the curves of a supply power supplied by a ballast in different operating modes of a lamp in the method according to the invention, and also the possible transitions between these modes as a function of external commands.

By way of example, three different operating modes of a xenon system have been shown in FIG. 1, along with a "default" operating mode.

In the default mode A, the applied initial power P1 at start-up (t is less than t1), that is to say in the first few tens of milliseconds, is high. In this mode A, after a few tens of seconds (t greater than t2), the applied power has stabilized at a mean nominal value P4.

This default mode corresponds to the simple case where the switching of the lamp is controlled by a relay, either an electromechanical relay or a solid-state relay.

In the case of a system of AFS type, or in general in the case of an evolved system in which it is desired to increase the service life of the lamp by best adapting the required luminous power as a function of circumstances, the lamp is switched into other modes B, C, D in which it is temporarily over-supplied with power or, on the contrary, in an economy mode.

For flashing headlamps for example, the lamp is switched to a mode D in which the initial power P1 applied at start-up is the same as that applied in the default mode A, but during the ignition phase (between t1 and t2) this power P3 is greater.

In practice, the economy modes B, C, in which the initial power P2 applied is lower than that of the default mode A and/or the nominal power in the steady state P4, P5 is lower than or equal to that of the mode correspond to the "dipped beam" position or daytime lighting.

In some embodiments, an operating mode E may also be provided which corresponds to a sudden decrease in power from the power P3 to P5 or P3 to P4. Mode E may for example correspond to a requirement in terms of operating safety (non-glare in default situations) in the case of AFS, DBL functions for example.

The method according to the invention has the aim of managing the switching of these modes.

As already mentioned above, the operation of the lamp in one phase depends on the operation in the previous phase. The command signals COM1 on which the method according to the invention is based therefore do not directly force an operating point as a function of their values S1, S2, S3, but rather control the transitions from one mode to another, that is to say that the power applied to the lamp in response to a given command signal S1, S2 or S3 depends on the operating phase in which it is in.

Table I below shows, by way of example, the possible transitions to the four modes A, B, C, D described above upon receiving three command signals S1, S2, S3 according to the operating phases of the lamp ("Pi" denotes "initial power"; "Pn" denotes "nominal power").

TABLE I

| COM1 | Receipt before t1 (start-up) | Receipt between t1 and t2 (ignition) | Receipt after t2 (steady-state) | Mode |
|---|---|---|---|---|
| none | Pi = P1 Pn = P4 | Pi = P1 Pn = P4 | Pn = P4 | A |
| S1 | Pi = P2 Pn = P4 | Pi = P1 Pn = P4 | Pn = P4 | B |
| S2 | Pi = P2 Pn = P5 | Pi = P1 Pn = P5 | Pn = P5 | C |
| S3 | Pi = P1 Pn = P3 | Pi = P1 Pn = P3 | Pn = P3 | D |

In the preferred embodiments of the invention, the default initial power applied by the xenon system in the event of an absence of command signals has a predetermined value P1 for example of 65 W.

In the same situation, the default nominal power in the steady state has a predetermined value P4 for example of 34 W.

The three command signals S1, S2, S3 advantageously correspond respectively:
to a specific initial power having a predetermined value P2=50 W, or P2=50 W, or P4=65 W and to a specific nominal power having a predetermined value P4=34 W, or P5=30 W, or P3=38 W when the command is received by the ballast in the start-up phase;
to a specific initial power having a predetermined value P1=65 W, or P1=65 W, or P1=65 W and to a specific nominal power having a predetermined value P4=34 W, or P5=30 W, or P3=38 W when the command is received by the ballast in the ignition phase;
to a specific nominal power having a predetermined value P4=34 W, or P5=30 W, or P1=38 W when the command is received by the ballast in the steady-state phase.

The reliability of control by an external system X of the transitions between the different operating modes A, B, C, D of the xenon system P of a headlamp is ensured in the method according to the invention by means of a validation signal COM2 for validating the command signals COM1.

The xenon system P is also capable of signalling an operating fault to the external system X and, at the request of this system X, of transmitting an anomaly code A1, A2, A3.

Figure 2:
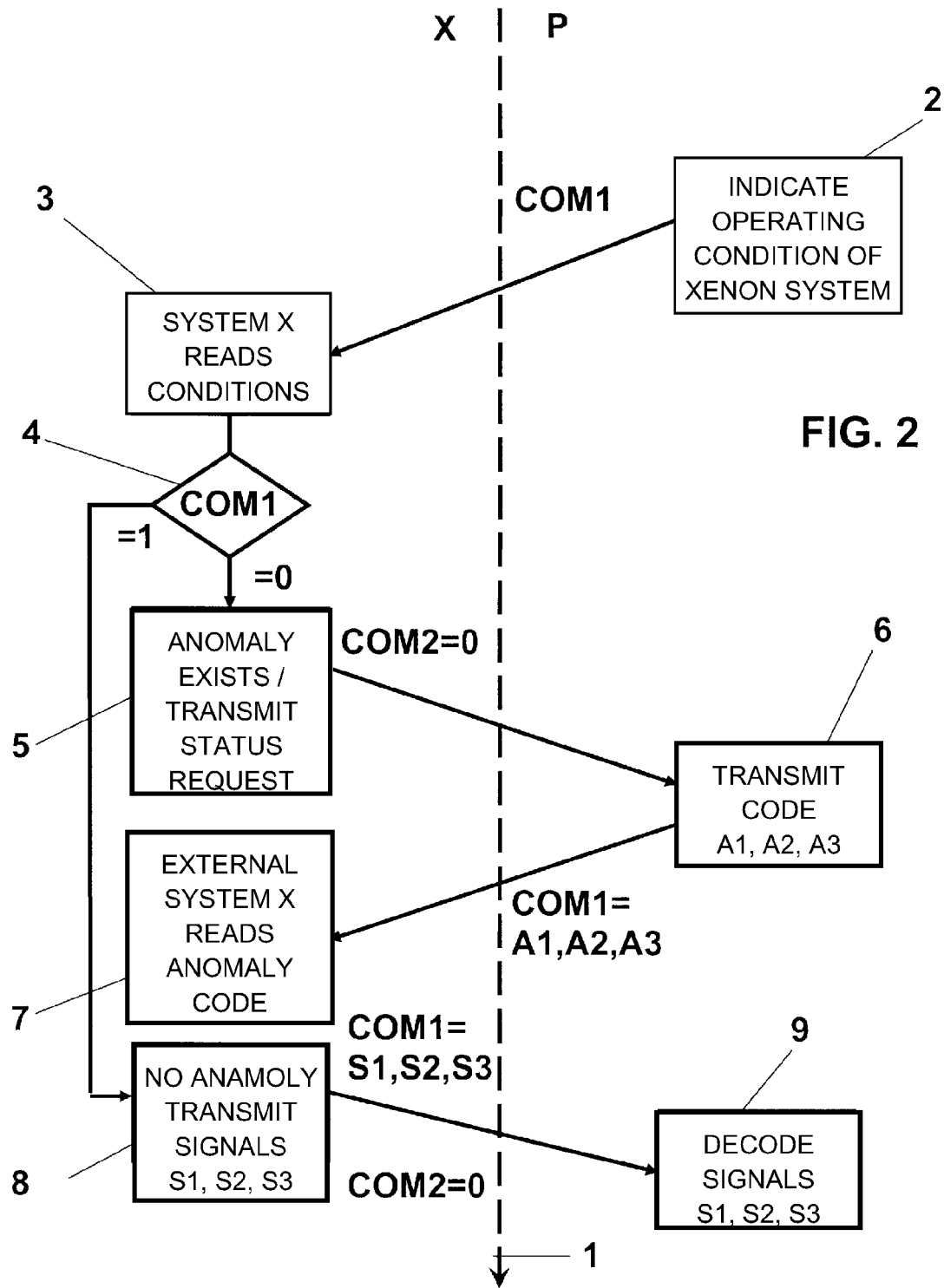
FIG. 2 is a schematic diagram of the communication protocol used by the method according to the invention between the ballast and the external electronic control unit.

The protocol for communication over time 1 between the xenon system P and the external system X is shown by the diagram in FIG. 2.

In the starting step 2, the xenon system P indicates its operating conditions—normal or abnormal—in binary fashion to the external system X on the same first communication channel COM1 as that used for the command signals S1, S2, S3.

The external system X reads the operating conditions of the xenon system P during a second step 3 of the protocol, and determines 4 whether it exhibits an anomaly.

If the xenon system P exhibits an anomaly (COM1=0), the external system X transmits during a third step 5 a status request (COM2=0) to the xenon system P on the same second communication channel COM2 as that used for the validation signal for validating the command signals S1, S2, S3.

Once the xenon system P has received this status request during a fourth step 6, it transmits an anomaly code A1, A2, A3 on the first communication channel COM1.

This anomaly code A1, A2, A3, along with proprietary anomaly codes, can be read by the external system X during a fifth step 7.

If, during the test 4 following the second step 3, the external system X determines that the operating conditions of the xenon system P are normal (COM1=1), it transmits to the xenon system P the command signals S1, S2, S3 appropriate for a change of mode A, B, C, D and the validation signal (COM2=0) during a sixth step 8.

During the final step 9 of the protocol, the xenon system P decodes the command signals S1, S2, S3.

Many technical solutions exist for forming the physical layer which is able to support the communication protocol described above, in particular connections of the "series" type or on-board networks of the LIN or CAN type.

Many standard solutions have the disadvantage of using electronic components which are relatively complex and which are relatively expensive to integrate.

Moreover, these standard solutions generally have high performance levels which are not really suitable, given the simplicity of the protocol and the low information flow rates that are required.

Finally, the breakdown diagnostics of these solutions often require dedicated equipment.

Figure 3:
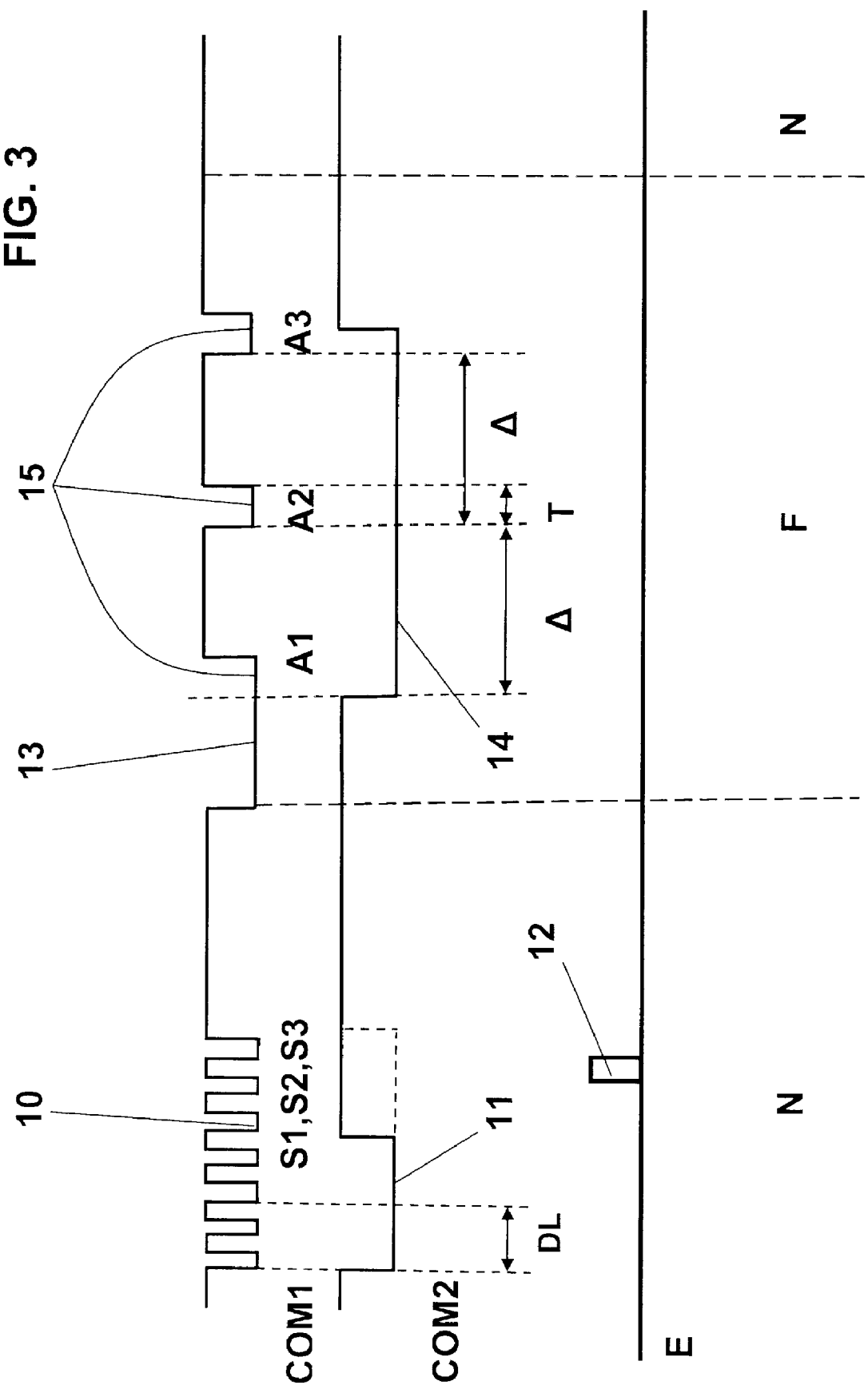
FIG. 3 is a schematic diagram of the control signals used in the method according to the invention.

By contrast, the signals used by the method according to the invention as shown in FIG. 3 can easily be displayed using a simple oscilloscope, and the operating faults are detected by a simple voltmeter.

The command signals S1, S2, S3 transmitted by the external system X on the first communication channel COM1 to the xenon system P, under normal operating conditions N, consist of a first square-wave pulse train 10, the predetermined fixed frequency of which is preferably equal to 400 Hz, but in any case is between 380 Hz and 420 Hz.

These first square-wave pulse trains 10 have a positive amplitude of between 0 V and the voltage level of the on-board power source, that is to say 12 V for a standard power supply by means of a battery.

The encoding of the command signals S1, S2, S3 is carried out by modulating the width of the first square-wave pulse trains 10. An active level is a voltage level of less than 1 V; a voltage level of more than 6 V, such as that of the battery, corresponds to an absence of signal.

In the preferred embodiments of the invention, the duty factor of the first square-wave pulse trains 10 has a value of 30%, or 60%, or 80%, depending on the desired operating mode B, C, D shown in Table 1. The default operating mode A is obtained in the absence of any signal.

The transmission of the command signals S1, S2, S3 is signaled by the external system X to the xenon system P by sending a validation signal on the second communication channel COM2, the validation signal consisting of a first square-wave pulse 11. This first square-wave pulse 11 has an amplitude of between 0 V and the voltage level of the battery, that is to say usually 12 V. An active level is a level of less than 1 V; a voltage level of more than 6 V corresponds to an absence of signal.

The first square-wave pulse 11 is transmitted throughout the entire duration of transmission of the first square-wave pulse train 10 of the command signals S1, S2, S3, or at least for a duration DL that is sufficient to allow the detection of these signals. Preferably, this duration DL corresponds to at least two periods of the first square-wave pulse train 10.

As soon as a command signal S1, S2, S3 has been decoded, the state E of the xenon system P changes 12, as shown in the timing diagram of FIG. 3.

In the event of an operating anomaly F of the xenon system P, a second square-wave pulse 13 is generated by the latter on the first communication channel COM1. This second square-wave pulse 13 is active at low level, that is to say preferably, in this direction of communication on this channel, when its level is less than 3 V.

As soon as a low level is detected on the first communication channel COM1, the external system X generates on the second communication channel COM2 a third square-wave pulse 14 which is designed to trigger the transmission by the xenon system P on the first channel COM1 of a second square-wave pulse train 15, the duration T of which codes for the type of anomaly A1, A2, A3.

The third square-wave pulse 14 is active at low level, that is to say when its voltage level is less than 1 V. The pulses of the second square-wave pulse train 15 are considered to be active when their voltage level is less than 3 V.

In the preferred embodiments of the invention, the pulses of this second square-wave pulse train 15 are transmitted by the xenon system P at a predetermined interval Δ, preferably 10 ms, throughout the entire duration of the third square-wave pulse 14 on the second communication channel COM2.

The duration of each of the pulses 15 of the second train is, for example, 0.5 ms, 1 ms, 1.5 ms, 2 ms, 2.5 ms, or 3 ms so as to indicate respectively an abnormal extinction, a high current, a high voltage, a low current, a low voltage or a fault in igniting the lamp, or else a short-circuit of the ballast of the xenon system P.

In the absence of any third square-wave pulse 14 (COM2=0) transmitted by the external system X, the xenon system P maintains at a low level the first communication channel COM1. This state can easily be detected by an operator by means of a simple voltmeter: an operating anomaly of the xenon system P is therefore easily diagnosed.

Figure 4:
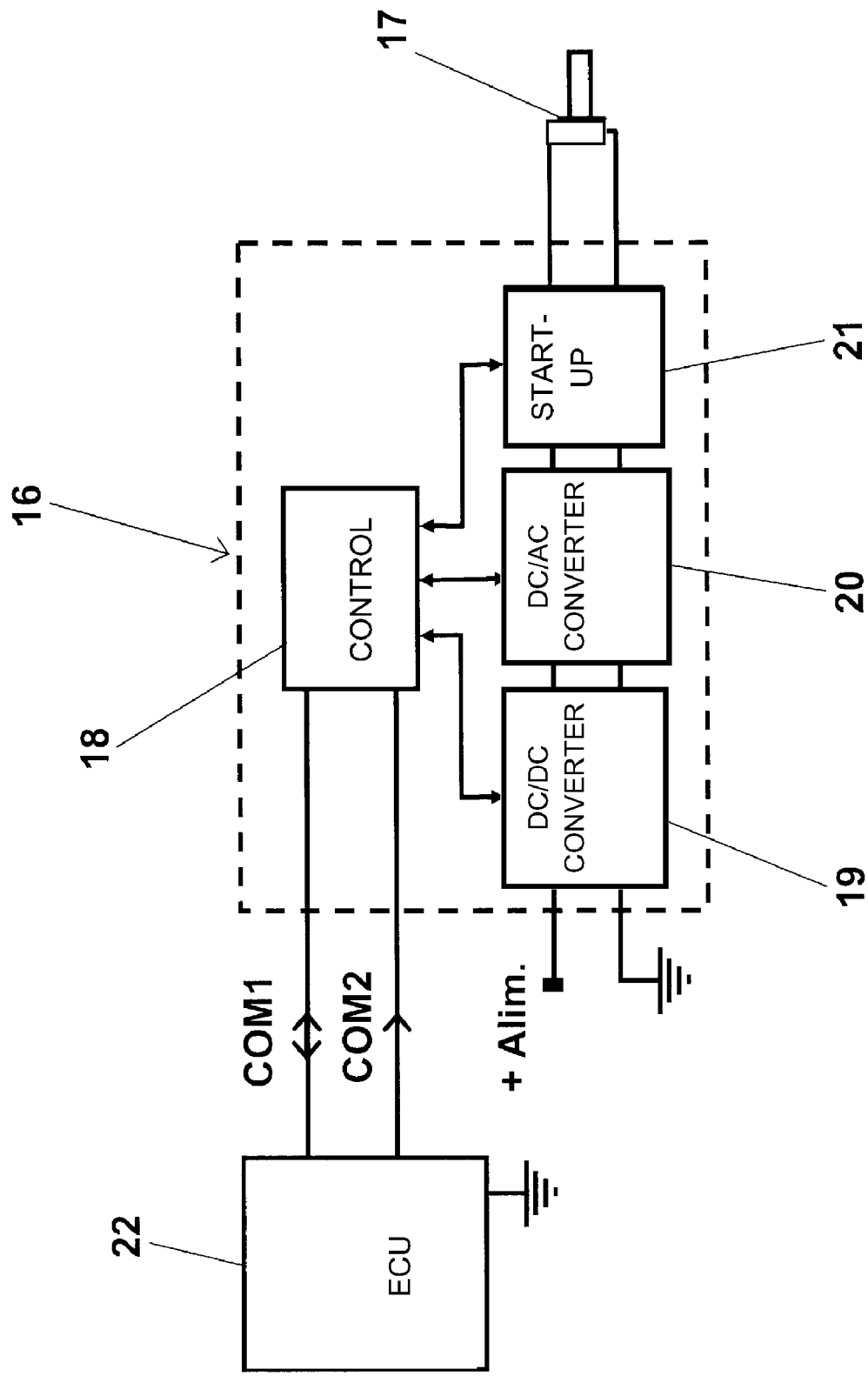
FIG. 4 is a block diagram of a device suitable for implementing the method according to the invention.
Figure 5:
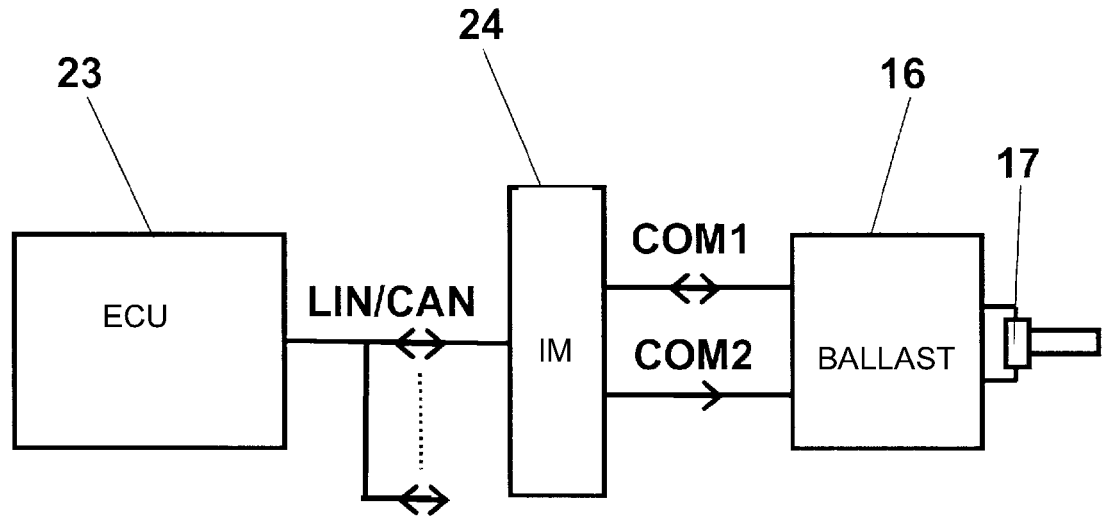
FIGS. 5 and 6 are, respectively in the case of an independent headlamp and in the case of twinned headlamps, are block diagrams showing a device implementing the method according to the invention on an on-board motor vehicle network of the LIN or CAN type.
Figure 6:
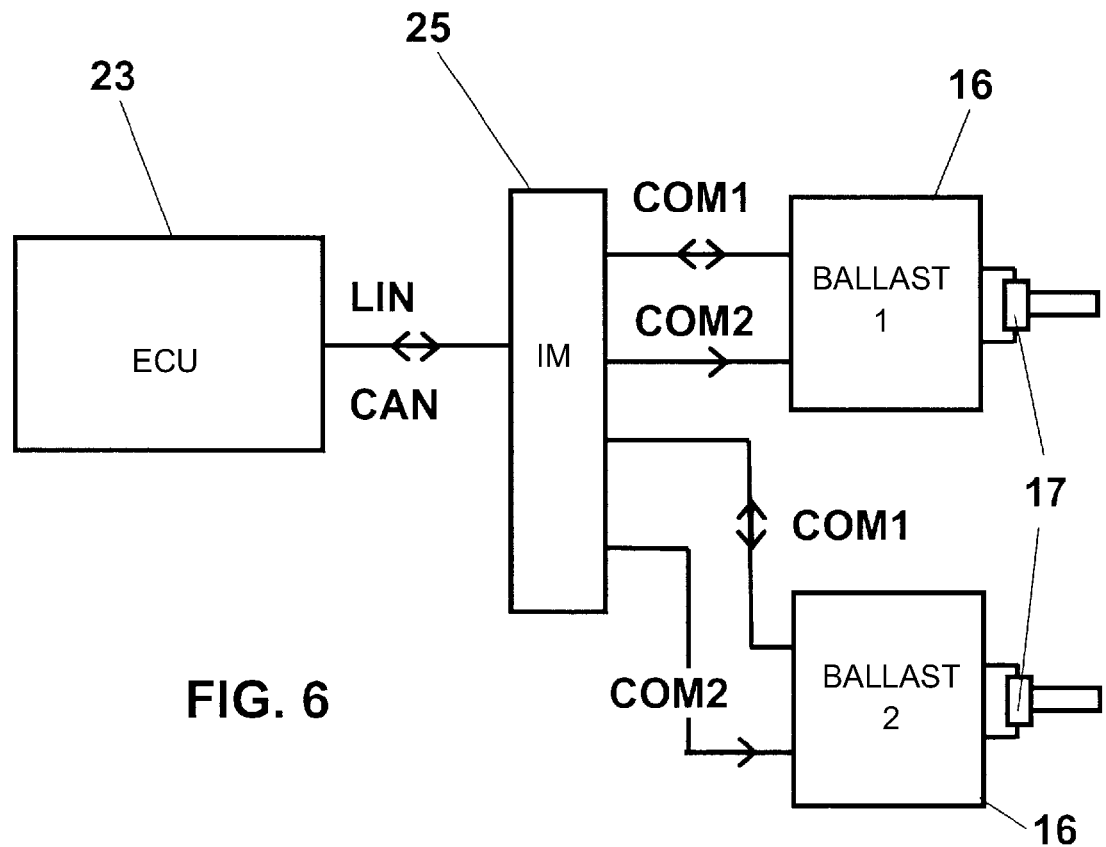

The steps 2, 3, 4, 5, 6, 7, 8, 9 (FIG. 2) and the first square-wave pulse train 10, the first square-wave pulse 11, the second square-wave pulse 13, the third square-wave pulse 14 and the second square-wave pulse train 15 of the method according to the invention are easily implemented on an external system X and a xenon system P of the type shown in FIGS. 4, 5, and 6.

The xenon system P comprises, in a manner known per se, a ballast 16 which is supplied by the on-board power supply +Alim and provides the necessary electrical power to a xenon lamp 17.

The ballast 16 consists of an electronic control block 18 which controls a DC/DC converter 19, a DC/AC converter 20, and a start-up block 21 of the xenon lamp 17. In other embodiments, the start-up block 21 may not be included in the ballast 16, but rather may be associated with the lamp in a compact lamp assembly.

The electronic control block 18 is connected by a dedicated two-wire connection COM1, COM2 to an electronic command unit 22 of the external system X. A first, bidirectional line COM1 transmits the command signals S1, S2, S3 and the anomaly signals A1, A2, A3; the second, unidirectional line COM2 transmits the validation signals and the status request signals.

The logic of the electronic control block 18 is advantageously implemented by means of an ASIC, in particular the internal power regulation, the storage of the power curves and the management of the communication protocol.

According to one variant embodiment which is shown in FIG. 5, the ballast 16 is connected by the dedicated two-wire connection COM1, COM2 to an interface module 24 which converts the protocol from and to a standard electronic command unit 23 which communicates by means of a standard single-wire connection of the LIN or CAN type.

According to another variant embodiment which is shown in FIG. 6, two ballasts 16 are connected to a double interface module 25.

The advantage of this architecture is that the complexity of managing the standard protocols is shifted to the interface modules 24, 25, so as to retain for the headlamps only a system which is simple to develop, to manufacture and to repair.

According to other variant embodiments, the interface module or modules is/are integrated in a more global module which also fully or partially manages LCS and in particular DBL lighting functions or manages a number of front functions, including the lighting. Depending on the applications, the interface modules may also be integrated fully in a lighting and/or indicating device such as a headlamp, or may be associated with the latter in the form of an electronic module mounted on the casing of the headlamp or may form a separate element which is installed elsewhere in the vehicle.

It will readily be understood that the invention is not limited solely to the preferred embodiments described above. On the contrary, it also encompasses all the other possible variant embodiments.

Particularly the details concerning the formation of the physical layer of the communication protocol used by the method according to the invention described above are in no way limiting.

Any other implementation would not depart from the scope of the present invention in so far as it would result from the appended claims.

What is claimed is:

1. A method for managing a ballast of a gas discharge lamp for a motor vehicle headlamp so as to optimize a service life of said gas discharge lamp, said method comprising the steps of:
controlling an initial supply power and a nominal supply power of said gas discharge lamp by means of control signals during the operating phases of said gas discharge lamp which comprise a start-up phase, an ignition phase and a steady-state phase;
generating externally of said ballast said control signals comprise command signals which force each of said initial and nominal supply powers to a value selected from a set of predetermined powers as a function of each of said phases;
providing said command signals to an electronic control of said ballast using a bidirectional data transfer line; and
providing an unidirectional signaling line for providing at least one of a validation signal to said electronic control of said ballast.

2. The method for managing a ballast of a gas discharge lamp for a motor vehicle headlamp according to claim 1, wherein, in the absence of said command signals, a value of said initial supply power during said start-up and ignition phases is a predetermined default initial power and said nominal supply power during said steady-state phase is a predetermined default nominal power.

3. The method for managing a ballast of a gas discharge lamp for a motor vehicle headlamp according to claim 2, wherein each command signal is associated with a specific operating mode of said gas discharge lamp and forces said supply powers to a predetermined specific initial power and to a predetermined specific nominal power for each of said phases.

4. The method for managing a ballast of a gas discharge lamp for a motor vehicle headlamp according to claim 1, wherein said control signals also comprise a validation signal for validating said command signals which is generated externally of said ballast.

5. The method for managing a ballast of a gas discharge lamp for a motor vehicle headlamp according to claim 1, wherein said control signals also comprise an anomaly signal which is generated by said ballast in the event of an operating anomaly.

6. The method for managing a ballast of a gas discharge lamp for a motor vehicle headlamp according to claim 5, wherein said control signals also comprise a status request signal which is generated externally of said ballast following the receipt of said anomaly signal.

7. The method for managing a ballast of a gas discharge lamp for a motor vehicle headlamp according to claim 6, wherein said control signals also comprise an anomaly code which is generated by said ballast following the receipt of said status request signal.

8. A method for managing a ballast of a gas discharge lamp for a motor vehicle headlamp so as to optimize a service life of said gas discharge lamp, said method comprising the steps of:
controlling an initial supply power and a nominal supply power of said gas discharge lamp by means of control signals during the operating phases of said gas discharge lamp which comprise a start-up phase, an ignition phase and a steady-state phase;
generating externally of said ballast said control signals to comprise command signals which force each of said initial and nominal supply powers to a value selected from a set of predetermined powers as a function of each of said phases;
wherein, in the absence of said command signals, a value of said initial supply power during said start-up and ignition phases is a predetermined default initial power and said nominal supply power during said steady-state phase is a predetermined default nominal power;
wherein each command signal is associated with a specific operating mode of said gas discharge lamp and forces said supply powers to a predetermined specific initial power and to a predetermined specific nominal power for each of said phases;
wherein each of said command signals consists of a first square-wave pulse train of predetermined frequency and of predetermined duty factor, and in that said validation signal is a first square-wave pulse which is transmitted simultaneously with said command signals and for a duration that is at least equal to a minimum number of periods of said first square-wave pulse train, preferably two.

9. The method for managing a ballast of a gas discharge lamp for a motor vehicle headlamp according to claim 8, wherein the amplitudes of said first square-wave pulse train and of said first square-wave pulse are positive and are equal to the voltage of the battery or the analogous electrical power source of said vehicle, and in that said first square-wave pulse is active at low level, and the voltage level of the battery corresponds to an absence of signal.

10. The method for managing a ballast of a gas discharge lamp for a motor vehicle headlamp according to claim 9, wherein said predetermined specific initial power is around 65 W, said predetermined default nominal power is around 34 W, and in that said duty factor has a value of around 30%, or around 60%, or around 80%, corresponding respectively:
to a predetermined specific initial power of around 50 W, or around 65 W and to a predetermined specific nominal power of around 34 W, or around 30 W, or around 38 W when the command is received by said ballast in said start-up phase;
to a predetermined specific initial power of around 65 W, or around 65 W and to a predetermined specific nominal power of around 34 W, or around 30 W, or around 38 W when the command is received by said ballast in said ignition phase;
to a predetermined specific nominal power of around 34 W, or around 30 W, or around 38 W when the command is received by said ballast in said steady-state phase.

11. A method for managing a ballast of a gas discharge lamp for a motor vehicle headlamp so as to optimize a service life of said gas discharge lamp, said method comprising the steps of:
controlling an initial supply power and a nominal supply power of said gas discharge lamp by means of control signals during the operating phases of said gas discharge lamp which comprise a start-up phase, an ignition phase and a steady-state phase;
generating externally of said ballast said control signals to comprise command signals which force each of said initial and nominal supply powers to a value selected from a set of predetermined powers as a function of each of said phases;
wherein said control signals also comprise an anomaly signal which is generated by said ballast in the event of an operating anomaly;
wherein said anomaly signal, a status request signal and an anomaly code are respectively a first square-wave pulse, a third square-wave pulse and a second square-wave pulse train, the duration of each of the pulses of said second square-wave pulse train being representative of a type of anomaly.

12. The method for managing a ballast of a gas discharge lamp for a motor vehicle headlamp according to claim 11, wherein the amplitudes of said second and third square-wave pulses and of said second square-wave pulse train are positive and are equal to the voltage of the battery or the analogous electrical power source of said vehicle, and in that said second and third square-wave pulses are active at low level, and the voltage level of the battery corresponds to an absence of signal.

13. The method for managing a ballast of a gas discharge lamp for a motor vehicle headlamp according to claim 12, wherein the pulses of said second square-wave pulse train are transmitted by said ballast at a predetermined time interval throughout the entire duration of said third square-wave pulse, and in that the duration of each of the pulses of said second square-wave pulse train is around 0.5 ms, around 1 ms, around 1.5 ms, around 2 ms, around 2.5 ms, or around 3 ms to indicate respectively an abnormal extinction, a high current, a high voltage, a low current, a low voltage or a fault in igniting said gas discharge lamp, or else a short-circuit of said ballast.

14. A device for managing a ballast of a gas discharge lamp for a motor vehicle headlamp, which is suitable for implementing the method according to claim 1, of the type in which an electronic command unit is connected to an electronic control block of said ballast which controls a DC/DC converter, a DC/AC converter and a start-up block for starting said lamp, wherein the connection between said electronic command unit and said control block comprises a dedicated two-wire connection, comprising a first, bidirectional data transfer line and a second, unidirectional signaling line for signaling by said electronic command unit.

15. The device for managing a ballast of a gas discharge lamp for a motor vehicle headlamp according to claim 14, wherein the connection between said electronic command unit and said control block comprises a standard single-wire connection, of the LIN or CAN type, which connects said electronic command unit to an interface module which carries out the protocol conversion between said single-wire connection and said two-wire connection.

16. The device for managing a ballast of a gas discharge lamp for a motor vehicle headlamp according to claim 15, wherein said interface module is connected to at least two such ballasts, in each case by one such two-wire connection.

17. The use of the method and/or of the device for managing a ballast of a gas discharge lamp for a motor vehicle headlamp according to claim 1 in an evolved or adaptive lighting system, of the AFS type, in particular for transitions between full beam/dipped beam, adaptation to the ambient light and modulation of the intensity of the beam when travelling round bends.

* * * * *